United States Patent
Chung et al.

(10) Patent No.: US 12,474,400 B2
(45) Date of Patent: Nov. 18, 2025

(54) METHOD AND SYSTEM FOR TESTING AND MANUFACTURING SEMICONDUCTOR DEVICE

(71) Applicant: Samsung Electronics Co., Ltd., Suwon-si (KR)

(72) Inventors: Bumsuk Chung, Suwon-si (KR); Hyungseok Kang, Suwon-si (KR); Kyewan Park, Suwon-si (KR); Sungbo Shim, Suwon-si (KR); Sanghyun Ahn, Suwon-si (KR); Inkap Chang, Suwon-si (KR); Minho Jeong, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 279 days.

(21) Appl. No.: 18/164,256

(22) Filed: Feb. 3, 2023

(65) Prior Publication Data
US 2023/0305055 A1   Sep. 28, 2023

(30) Foreign Application Priority Data
Mar. 25, 2022   (KR) .................. 10-2022-0037588

(51) Int. Cl.
G01R 31/28   (2006.01)
(52) U.S. Cl.
CPC ................. G01R 31/2896 (2013.01)
(58) Field of Classification Search
CPC ............ G01R 31/2896; G01R 31/2894; G01R 31/287; H01L 22/20; H01L 22/14
See application file for complete search history.

(56) References Cited

U.S. PATENT DOCUMENTS 6,009,545 A * 12/1999 Tsutsui .................. H01L 22/20
                                                          714/799
6,349,240 B2   2/2002 Ogawa et al.
(Continued)

FOREIGN PATENT DOCUMENTS

JP   2001-273793 A   10/2001
JP   2012-023382 A   2/2012
(Continued)

OTHER PUBLICATIONS

H. Gun Kim, Y. S. Han and J.-H. Lee, "Package yield enhancement using machine learning in semiconductor manufacturing," 2015 IEEE Advanced Information Technology, Electronic and Automation Control Conference (IAEAC), Chongqing, China, 2015, pp. 316-320 (Year: 2015).*

(Continued)

*Primary Examiner* — Daniel R Miller
(74) *Attorney, Agent, or Firm* — Harness, Dickey & Pierce, P.L.C.

(57) ABSTRACT

A method of testing a semiconductor device includes obtaining first data generated by testing wafers, each including a plurality of chips, the obtaining based on a plurality of first items, obtaining second data generated by testing packages, each including a packaged chip, the obtaining based on a plurality of second items, detecting correlations between the plurality of first items and the plurality of second items, based on the first data and the second data, identifying at least one first item affecting variation of the packages, based on the correlations, and testing the identified at least one first item.

19 Claims, 22 Drawing Sheets

(56) References Cited

U.S. PATENT DOCUMENTS

| | | | |
|---|---|---|---|
| 7,043,384 | B2 | 5/2006 | Matsushita et al. |
| 7,474,979 | B1 | 1/2009 | Stevens et al. |
| 10,622,231 | B2 | 4/2020 | Ahn et al. |
| 2001/0026949 | A1* | 10/2001 | Ogawa .................... H01L 22/20 324/759.02 |

FOREIGN PATENT DOCUMENTS

| | | |
|---|---|---|
| JP | 6656984 B2 | 3/2020 |
| KR | 10-0525103 B1 | 11/2005 |

OTHER PUBLICATIONS

C.-K. Hsu et al., "Test data analytics—Exploring spatial and test-item correlations in production test data," 2013 IEEE International Test Conference (ITC), Anaheim, CA, USA, 2013, pp. 1-10 (Year: 2013).*

S. Kang, S. Cho, D. An and J. Rim, "Using Wafer Map Features to Better Predict Die-Level Failures in Final Test," in IEEE Transactions on Semiconductor Manufacturing, vol. 28, No. 3, pp. 431-437, Aug. 2015 (Year: 2015).*

Korean Office Action dated Sep. 23, 2025 issued in Korean Patent Application No. 10-2022-0037588.

* cited by examiner

METHOD AND SYSTEM FOR TESTING AND MANUFACTURING SEMICONDUCTOR DEVICE

CROSS-REFERENCE TO RELATED APPLICATION

This application is based on and claims priority under 35 U.S.C. § 119 to Korean Patent Application No. 10-2022-0037588, filed on Mar. 25, 2022, in the Korean Intellectual Property Office, the disclosure of which is incorporated by reference herein in its entirety.

BACKGROUND

Example embodiments relate to a semiconductor device, and more particularly, to a method and/or a system for testing and/or manufacturing a semiconductor device.

Semiconductor devices may be manufactured through various sub-processes included in a semiconductor process. With an increase in the degree of integration of semiconductor devices, the complexity of a semiconductor process may be increased, and semiconductor devices manufactured through the same semiconductor process may have variation due to various factors. To detect the variations in a semiconductor device, a semiconductor process may include sub-processes for testing semiconductor devices. However, testing the total of semiconductor devices may cause a lot of time and/or cost. Accordingly, there may be a demand or desire for a method of accurately and efficiently testing semiconductor devices.

SUMMARY

Various example embodiments provide a method and/or system for more accurately and/or more efficiently testing and manufacturing a semiconductor device by detecting factors affecting the variation of a semiconductor device.

According to various example embodiments, there is provided a method of testing a semiconductor device, which includes obtaining first data generated by testing wafers, each including a plurality of chips, the obtaining the first data based on a plurality of first items, obtaining second data generated by testing packages, each including a packaged chip, the obtaining the second data based on a plurality of second items, detecting correlations between the plurality of first items and the plurality of second items, the detecting correlations based on the first data and the second data, and identifying at least one first item affecting variation of the packages, based on the correlations.

According to various example embodiments, there is provided a system includes at least one processor, and a non-transitory computer-readable medium including a series of instructions, wherein the at least one processor is configured to perform, by executing the series of instructions, the operations of obtaining first data generated by testing wafers, each including a plurality of chips, the obtaining the first data based on a plurality of first items, obtaining second data generated by testing packages, each including a packaged chip, the obtaining the second data based on a plurality of second items, detecting correlations between the plurality of first items and the plurality of second items, the detecting correlations based on the first data and the second data, and identifying at least one first item affecting variation of the packages, based on the correlations.

According to various example embodiments, there is provided a non-transitory computer-readable medium for storing a series of instructions, wherein the series of instructions, when executed by at least one processor, allow the at least one processor to perform a method of testing a semiconductor device, and the method of testing a semiconductor device includes obtaining first data generated by testing wafers, each including a plurality of chips, the obtaining the first data based on a plurality of first items, obtaining second data generated by testing packages, each including a packaged chip, the obtaining the second data based on a plurality of second items, detecting correlations between the plurality of first items and the plurality of second items, the detecting the correlations based on the first data and the second data, and identifying at least one first item affecting variation of the packages, based on the correlations.

BRIEF DESCRIPTION OF THE DRAWINGS

Various example embodiments will be more clearly understood from the following detailed description taken in conjunction with the accompanying drawings in which.

DETAILED DESCRIPTION OF VARIOUS EXAMPLE EMBODIMENTS

Figure 1:
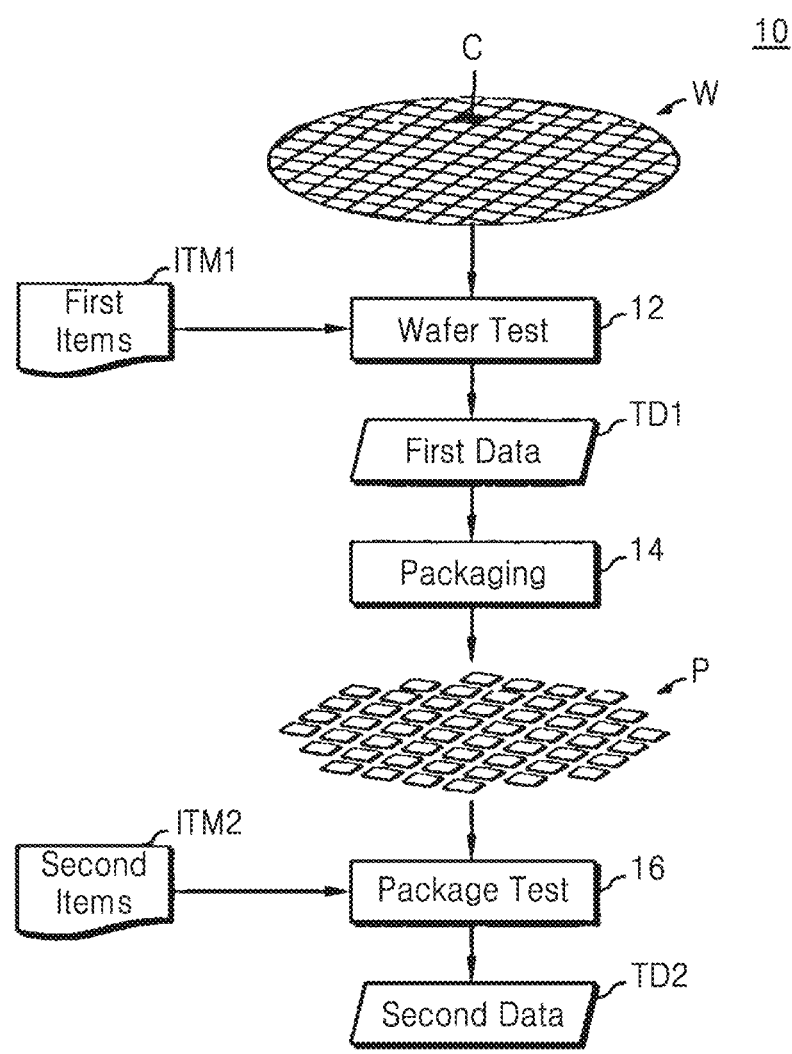
FIG. 1 is a block diagram of a semiconductor process according to some example embodiments.

FIG. 1 is a block diagram of a semiconductor process 10 according to some example embodiments. As illustrated in FIG. 1, a plurality of packages P may be generated from a wafer W in the semiconductor process 10. Herein, a semiconductor device may collectively refer to the wafer W, a chip (or die) included in the wafer W, and a package indicating a packaged chip.

The wafer W may include a plurality of chips. For example, as illustrated in FIG. 1, a chip C may be formed in various sub-processes, and may be referred to as a die. For example, a front-end-of-line (FEOL) may include, for example, planarizing and cleaning the wafer W, forming a trench, forming a well, forming a gate electrode, forming a source and a drain, and the like, and individual devices, for example, transistors, capacitors, resistors, and the like may be formed by FEOL. Furthermore, a back-end-of-line (BEOL) may include, for example, silicidation of a gate, a source and drain region, adding a dielectric, planarization, forming a hole, adding a metal layer, forming a via, forming a passivation layer, and the like, and individual devices, for example, a transistor, a capacitor, a resistor, and the like may be connected to each other by BEOL. In some example embodiments, a middle-of-line (MOL) may be performed between FEOL and BEOL, and contacts may be formed on individual devices. In some example embodiments, some processes may include one or more of a chemical mechanical planarization (CMP) process, a dry etching process, a wet etching process, a chemical vapor deposition (CVD) process such as a plasma-enhanced CVD process and/or a low-pressure CVD process, an ion implantation process, a photolithographic process, and/or the like.

Referring to FIG. 1, a wafer test 12 may be performed on the wafer W. The wafer test 12, which is different from a package test 16 described below, may be performed on the wafer W including a plurality of chips. As illustrated in FIG. 1, the wafer test 12 may be performed based on first items ITM1. The first items ITM1 may refer to test items of the wafer W, and in some example embodiments, may include thousands or more of test items. For example, the first items ITM1 may include functional test items and parametric test items. Functional test items may be used to test the operation of a chip, and may define, for example, input signals applied to a chip and output signals corresponding to the input signals. Functional tests may be performed with a self-test such as a built-in self-test (BIST), and/or may be performed by a testing equipment applying a particular test vector to the chip; example embodiments are not limited thereto. The test equipment may be or may include an automatic test equipment (ATE); however, example embodiments are not limited thereto. Parametric test items may be used to test electrical properties of a chip, and may define, for example, an input voltage applied to a chip and an output current corresponding to the input voltage, an input current applied to a chip and an output voltage corresponding to the input current, a speed of operation of the chip, and/or the like.

First data TD1 may be generated by the wafer test 12, and the first data TD1 may include a test result of the wafer W. For example, the first data TD1 may include values respectively corresponding to the first items ITM1. The values included in the first data TD1 may correspond to the wafer W, and may denote the properties of the wafer W. In some example embodiments, when the first data TD1 having values outside a normal and/or acceptable range is generated, the wafer W corresponding to the first data TD1 may be determined to be defective, and may be excluded from packaging 14 described below. Alternatively or additionally, when the first data TD1 has values in other ranges, the wafer W may be determined to be a lower quality, and be packaged as a lower quality wafer W.

The packaging 14 may be performed on a plurality of chips included in the wafer W, and the packages P may be generated. Protective layers and electrical connections may be added to each of a plurality of chips through the packaging 14. In some example embodiments, a plurality of chips may be separated from the wafer W by dicing (or sawing or singulating), and the packaging 14 is performed on the separated chips, so that the packages P may be generated. In some example embodiments, the packaging 14 may be performed on a plurality of chips included in the wafer W, and the packages P may be generated by dicing. The packaging 14 followed by dicing may be referred to as wafer-level packaging.

The package test 16 may be performed on the packages P. The package test 16, which is different from the wafer test 12 described above, may be performed on the packages P respectively corresponding to the chips included in the wafer W. As illustrated in FIG. 1, the package test 16 may be performed based on second items ITM2. The second items ITM2 may refer to the test items of each of the packages P, and in some example embodiments, may include several hundreds of test items. For example, the second items ITM2 may include functional test items and parametric test items. The functional test items may be used to test the operation of a package. Conditions, such as one or more of voltage, test patterns or vectors, temperature, humidity, speed, etc. of the functional and parametric test of the packages may be the same, or different, from corresponding conditions of the functional and parametric test of the die. For example, when a package is a semiconductor memory device, the functional test items may define a programming time, an erase time, a write cycle timing, and/or the like. The parametric test items may be used to test the electrical properties of a package, and may include, for example, an open test, a short test, an input/output leakage test, and the like.

Second data TD2 may be generated by the package test 16, and the second data TD2 may include a test result of the packages P. For example, the second data TD2 may include values respectively corresponding to the second items ITM2 in each of the packages P. The values included in the second data TD2 may correspond to the packages P, and may denote the properties of the packages P. In some example embodiments, when the second data TD2 having a value out of the normal range is generated, the package corresponding to the value may be determined to be defective, and may be excluded from shipment.

A sampling test for testing by selecting only some, and not all, of semiconductor devices may have a limitation in supplying semiconductor devices with high reliability required or desired by customers. For example, to continuously monitor quality deviation between wafers that passed the wafer test 12, an additional test may be performed on wafers sampled from the wafers within a statistical bin limit (SBL), based on the first data TD1. However, the sampling may have a limitation in testing semiconductor devices having high reliability, for example, a defect rate less than several parts per million (ppm). On the other hand, testing the total of semiconductor devices, for example, all packages that passed the packaging 14 may consume a lot of cost and time, and accordingly, the efficiency of the semiconductor process 10 may be reduced.

As described below with reference to various drawings, in a method of testing and manufacturing a semiconductor device, a correlation between the first items ITM1 used for the wafer test 12 and the second items ITM2 used for the package test 16 may be detected, and based on the detected correlation, at least one of the first items ITM1 affecting the variation of the packages P may be identified. Through the identified at least one first item, the quality of a semiconductor device may be more effectively controlled before the packaging 14, and the packaging 14 and the package test 16 for defective chips may be removed or may not be performed, and as a result, the efficiency of the semiconductor process 10 may be increased. Additionally or alternatively, even during the manufacturing of semiconductor devices, the semiconductor process 10 may be efficiently monitored, and accordingly, quality degradation that may be generated within the SBL due to an unpredicted factor may be more likely to be detected, and the quality deviation of semiconductor devices may be more effectively managed.

In some example embodiments, the wafer fabrication may be performed in the same facility as the wafer test 12; however, example embodiments are not limited thereto. In some example embodiments, the packaging 14 may be performed in the same facility as the package test 16; however, example embodiments are not limited thereto. In some example embodiments, the wafer test 12 may be performed in the same facility as the package test 16, and in some example embodiments, the wafer test 12 may be performed in a different facility as the package test 16.

Figure 2:
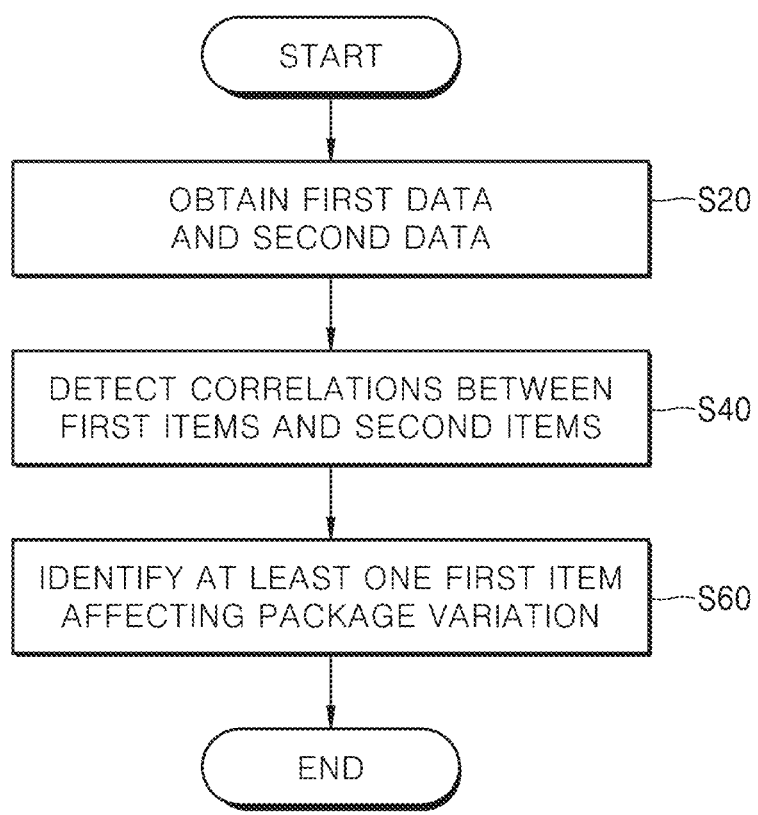
FIG. 2 is a flowchart of a method of testing a semiconductor device, according to some example embodiments.

FIG. 2 is a flowchart of a method of testing a semiconductor device, according to some example embodiments. As illustrated in FIG. 2, a method of testing a semiconductor device may include a plurality of operations S20, S40, and S60. Hereinafter, FIG. 2 is described with reference to FIG. 1.

In some example embodiments, the method of FIG. 2 may be implemented by a computing system described below with reference to FIGS. 15 and 16. For example, each of or at least some of the blocks illustrated in the accompanying drawings may correspond to hardware, software, or a combination of hardware and software included in a computing system, and may be able to communicate with others of the blocks, to engage in one-way, and/or two-way, and/or broadcast communications with one another, to exchange information such as but not limited to code and/or data. In some example embodiments, hardware may include at least one of a programmable component, such as a central processing unit (CPU), a digital signal processor (DSP), a graphics processing unit (GPU), a reconfigurable component, such as a field programmable gate array (FPGA), and a component providing a fixed function, such as an intellectual property (IP) block. In some example embodiments, software may include at least one of a series of instructions executable by a programmable component and code convertible by a compiler and the like into a series of instructions, and be stored in a non-transitory storage medium.

Referring to FIG. 2, in operation S20, the first data TD1 and the second data TD2 may be obtained, e.g. may be obtained, or provisioned from the same facility, and/or from different facilities. As described above with reference to FIG. 1, the first data TD1 may be generated by performing the wafer test 12 based on the first items ITM1, and the second data TD2 may be generated by performing the package test 16 based on the second items ITM2. In FIG. 2, the first data TD1 may refer to data generated by testing a plurality of wafers, and the second data TD2 may refer to data generated by testing a plurality of packages generated from a plurality of wafers.

In operation S40, correlations between the first items ITM1 and the second items ITM2 may be detected or determined. For example, the correlations between the first items ITM1 and the second items ITM2 may be detected based on the first data TD1 and the second data TD2 obtained in operation S20. Herein, a correlation between a first item and a second item may mean or correspond to a value of the second item and a value of the first item have relevancy, for example, dependency. In operation S40, a plurality of correlations may be detected, and each of the correlations may include a pair of a first item and a second item. Examples of operation S40 will be described below with reference to FIGS. 3 and 5. In some example embodiments, the correlations may be multilinear correlations; however, example embodiments are not limited thereto.

In operation S60, at least one first item affecting package variation may be identified. For example, among the correlations detected in operation S40, at least one correlation affecting a package defect may be identified, and at least one first item corresponding to at least one correlation may be identified. The identified at least one first item may be used for testing and manufacturing a semiconductor device. For example, as described below with reference to FIGS. 13A to 13D, the first item may affect package variation by various ways, and accordingly, at least one first item that is advantageous for screening a package defect may be identified. An example of operation S60 will be described below with reference to FIG. 11.

Figure 3:
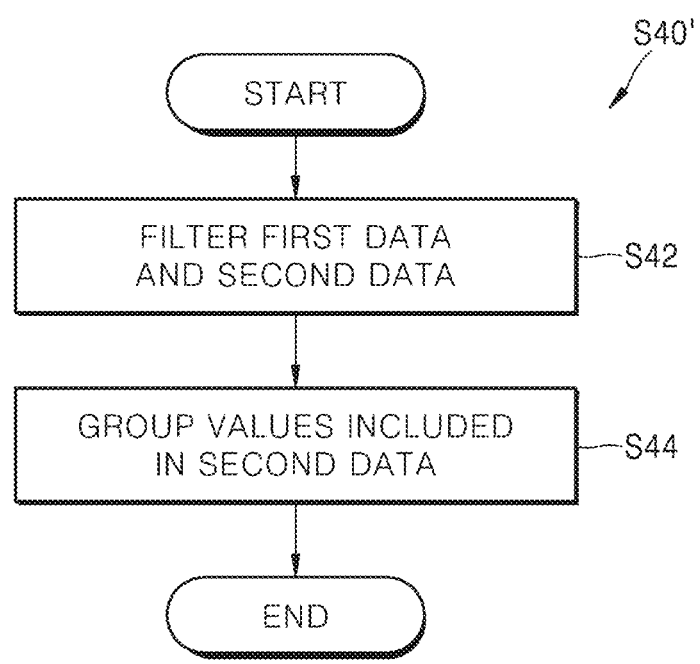
FIG. 3 is a flowchart of a method of testing a semiconductor device, according to some example embodiments.
Figure 4:
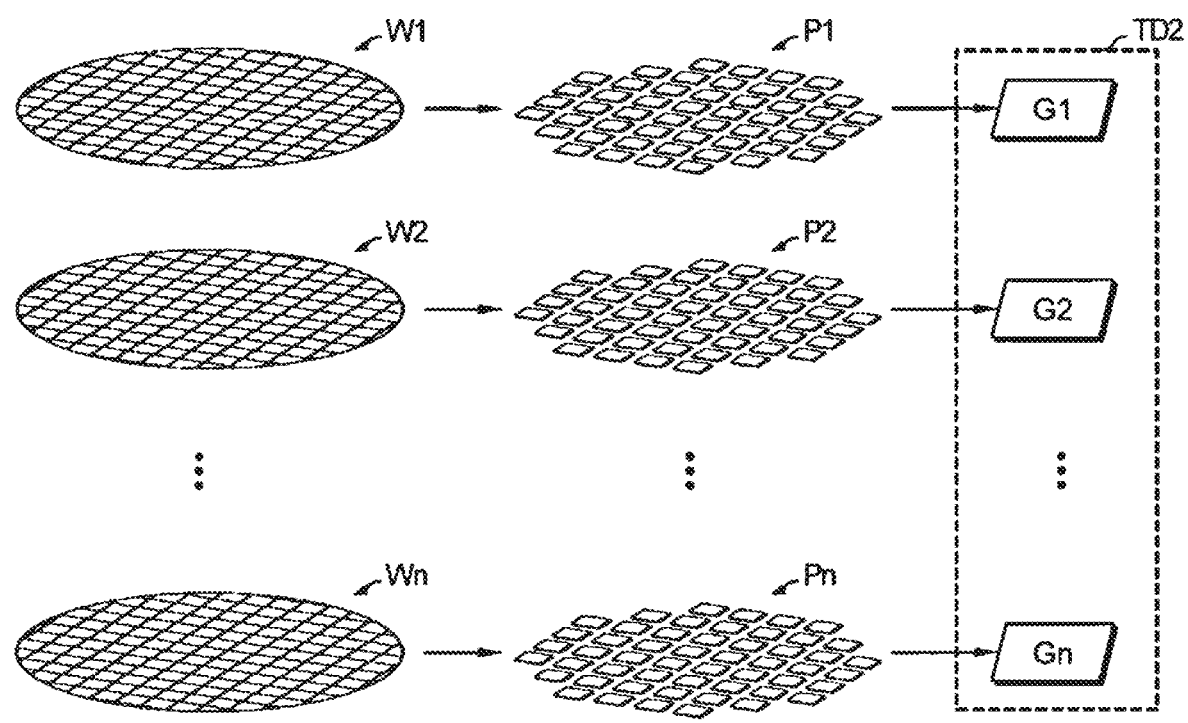
FIG. 4 is a block diagram of an operation of processing second data according to some example embodiments.

FIG. 3 is a flowchart of a method of testing a semiconductor device, according to some example embodiments, and FIG. 4 is a block diagram of an operation of processing second data according to some example embodiments. In detail, the flowchart of FIG. 3 shows an example of operation S40 of FIG. 2, and FIG. 4 shows an example operation performed in operation S44 of FIG. 3. As described above with reference to FIG. 2, in operation S40' of FIG. 3, correlations between the first items ITM1 and the second items ITM2 may be detected. Hereinafter, FIGS. 3 and 4 will be described with reference to FIG. 1.

Referring to FIG. 3, operation S40' may include operation S42 and operation S44. In operation S42, the first data TD1 and the second data TD2 may be filtered. For example, noise may be removed from the first data TD1 and the second data TD2. In some example embodiments, at least one first item of the first items ITM1, which is irrelevant or less likely to be relevant to package variation, may be identified, and values corresponding to the identified at least one first item may be removed from values included in the first data TD1. Similarly, at least one second item, for example, a second item to test the influence purely generated by the packaging 14, which is irrelevant or less likely to be relevant to the wafer test 12, may be identified from the second items ITM2, and values corresponding to the identified at least one second item may be removed from the values included in the second data TD2. In some example embodiments, outliers generated due to a test error and/or the like may be removed from the values included in the first data TD1 and the second data TD2. For example, outliers may be detected based on statistical values, for example, an average such as one or more of a mean, median, mode, a deviation such as one or more of a standard deviation, full-width at half-max, interquartile range, and the like, of the first items ITM1 and the second items ITM2.

In operation S44, the values included in the second data TD2 may be grouped. As described above with reference to FIG. 2, the first data TD1 collected in the method of testing a semiconductor device may correspond to a plurality of wafers, and the second data TD2 may correspond to a plurality of packages generated from respective ones of the plurality of wafers. To detect the correlations between the first items ITM1 and the second items ITM2, the values included in the second data TD2 may be grouped such that values of packages corresponding to the same wafer are included in the same group.

Referring to FIG. 4, a plurality of first packages P1 to a plurality of n-th packages Pn may be generated from a first wafer W1 to an n-th wafer Wn, respectively, where n is an integer greater than 1. As the package test 16 is performed on the first to n-th packages P1 to Pn, the second data TD2 may be generated. As illustrated in FIG. 4, the values of the second data TD2 may be grouped into a first group G1 to an n-th group Gn corresponding to the first to n-th packages P1 to Pn, respectively, and accordingly, the second data TD2 may include the first group G1 to the n-th group Gn. In some example embodiments, the grouping of the values included in the second data TD2 may be performed by adding the same label to the values included in the same group. For example, the values included in the first group G1 may each include a label indicating the first group G1.

Figure 5:
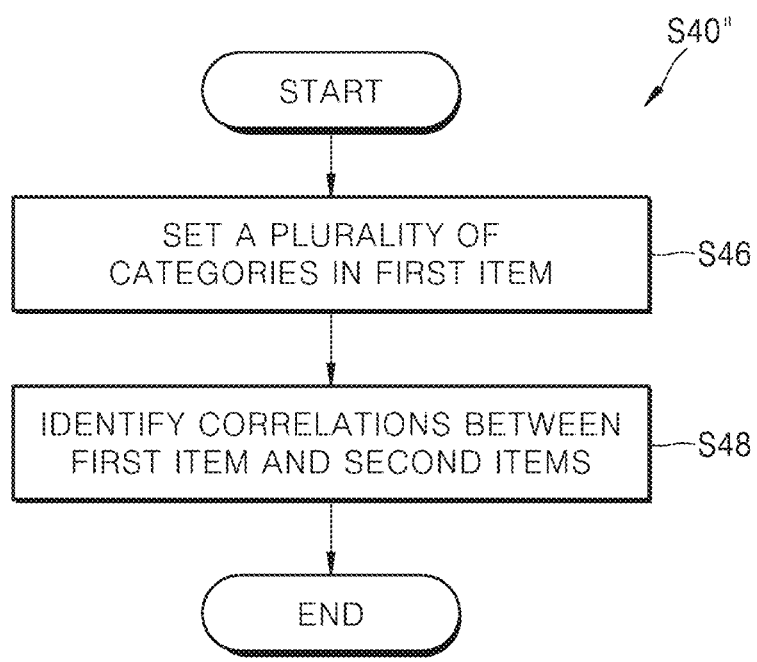
FIG. 5 is a flowchart of a method of testing a semiconductor device, according to some example embodiments.

FIG. 5 is a flowchart of a method of testing a semiconductor device, according to some example embodiments. In detail, the flowchart of FIG. 5 shows an example of operation S40 of FIG. 2. As described above with reference to FIG. 2, in operation S40" of FIG. 5, correlations between the first items ITM1 and the second items ITM2 may be detected. As illustrated in FIG. 5, operation S40" may include operation S46 and operation S48. In some example embodiments, operation S46 and operation S48 of FIG. 5 may be performed subsequent to operation S44 of FIG. 3. Operation S40" of FIG. 5 may be performed with respect to one first item selected from among the first items ITM1, and may be repeated for each of the first items ITM1. Hereinafter, FIG. 5 will be described with reference to FIG. 1.

In operation S46, a plurality of categories may be set in the first item. For example, a plurality of categories may be set in each of the first items ITM1 based on the first data TD1. The values included in the first data TD1 may have various distributions according to the first item. The categories may be set based on the values of the first item, and the values of the second items ITM2 corresponding to each of the categories may be analyzed. An example of operation S46 will be described below with reference to FIG. 7, and examples of categories will be described below with reference to FIGS. 8A and 8B.

In operation S48, the correlations between the first item and the second items ITM2 may be determined or identified. For example, wafers may be grouped based on the categories set in operation S46, and among the values of the second items ITM2 included in the second data TD2, values corresponding to different wafer groups may be separated. Accordingly, as described below with reference to FIGS. 6A and 6B, influences of the first items ITM1 used in the wafer test 12 on package variation may be detected. An example of operation S48 will be described below with reference to FIG. 10.

Figure 6A:
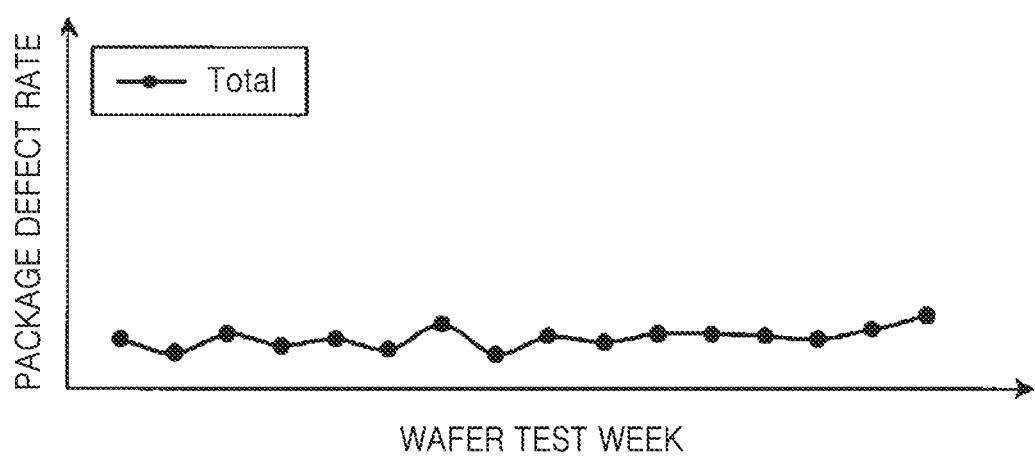
FIGS. 6A and 6B are graphs showing package defect rates according to some example embodiments.
Figure 6B:
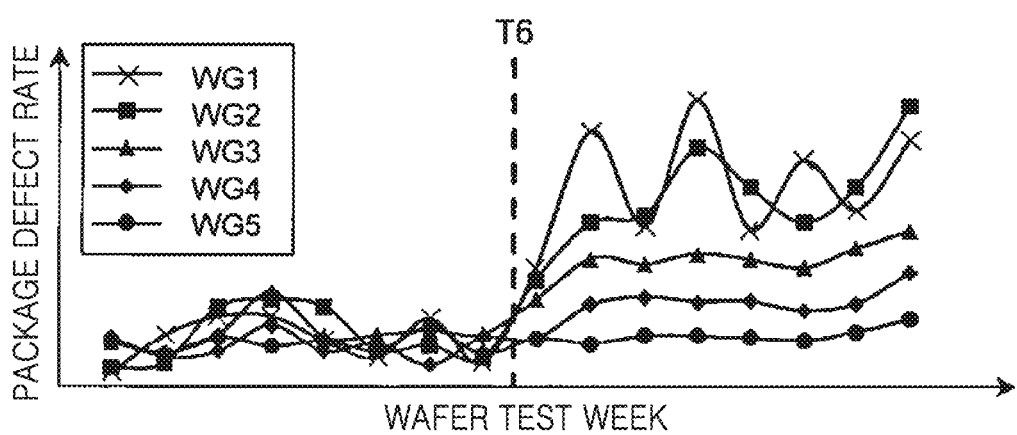

FIGS. 6A and 6B are graphs showing package defect rates according to some example embodiments. In detail, the graphs of FIGS. 6A and 6B show test results measured every week in or for a semiconductor process. The graph of FIG. 6A shows a package defect rate measured in the semiconductor process, and the graph of FIG. 6B shows the defect rates of packages corresponding to each of the wafer groups. A defect rate indicated by a curve of FIG. 6A may correspond to the sum of defect rates indicated by curves of FIG. 6B. Although, in FIG. 6B, wafers are grouped into five groups based on the five categories, it is noted that the wafers may be grouped into two or more wafer groups, such as more than five groups.

Referring to FIG. 6A, it may not be easy to detect a change in the package defect rate over time; for example, a statistical test of the total variation may not identify a change in the defect rate. Furthermore, even when a change in the package defect rate, for example, a slight increase, is detected, it may not be easy to find a reason or a hypothesis for the change in the package defect rate. However, referring to FIG. 6B, while having a similar package defect rate until a time point T6, the wafer groups may have different package defect rates from the time point T6. As described above with reference to FIG. 5, the wafer groups may correspond to the categories set based on the values of the first item, and accordingly, the wafer groups may include different numbers of wafers, respectively. A number of wafers included in each of the wafer groups WG1 to WG5 may be different from one another. For example, in FIG. 6B, when the number of wafers included in a first wafer group WG1 and a second wafer group WG2, in which the package defect rate remarkably increases from the time point T6, is less than 5% of the total wafers, and the number of wafers included in a fifth wafer group WG5, in which the package defect rate slightly increases or does not increase, is 90% or more of the total wafers, as in the curve of FIG. 6A, an increase in the total package defect rate may not be easily detected. However, as illustrated in FIG. 6B, when the wafers are grouped based on the categories, the first wafer group WG1 and the second wafer group WG2 may be detected, and accordingly, the first item of the categories may be identified as affecting the package defect.

Figure 7:
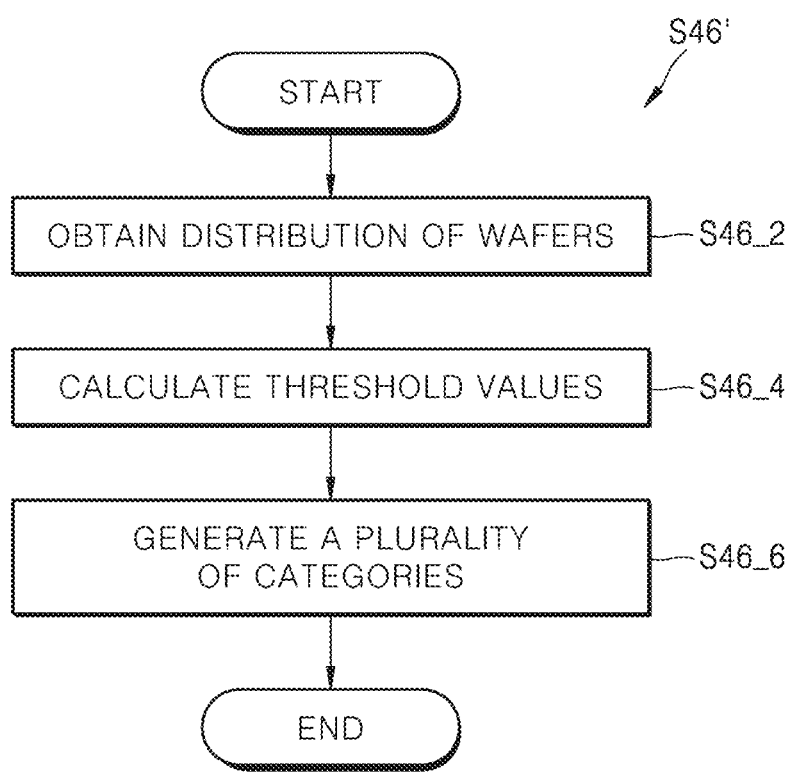
FIG. 7 is a flowchart of a method of testing a semiconductor device, according to some example embodiments.
Figure 8A:
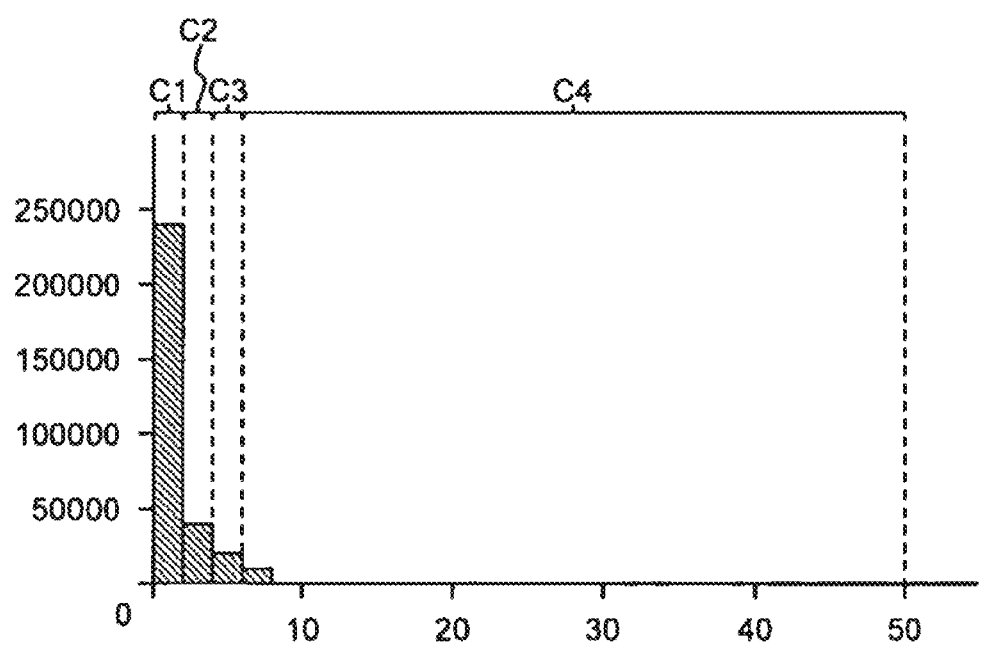
FIGS. 8A and 8B are graphs showing examples of categories according to some example embodiments.
Figure 8B:
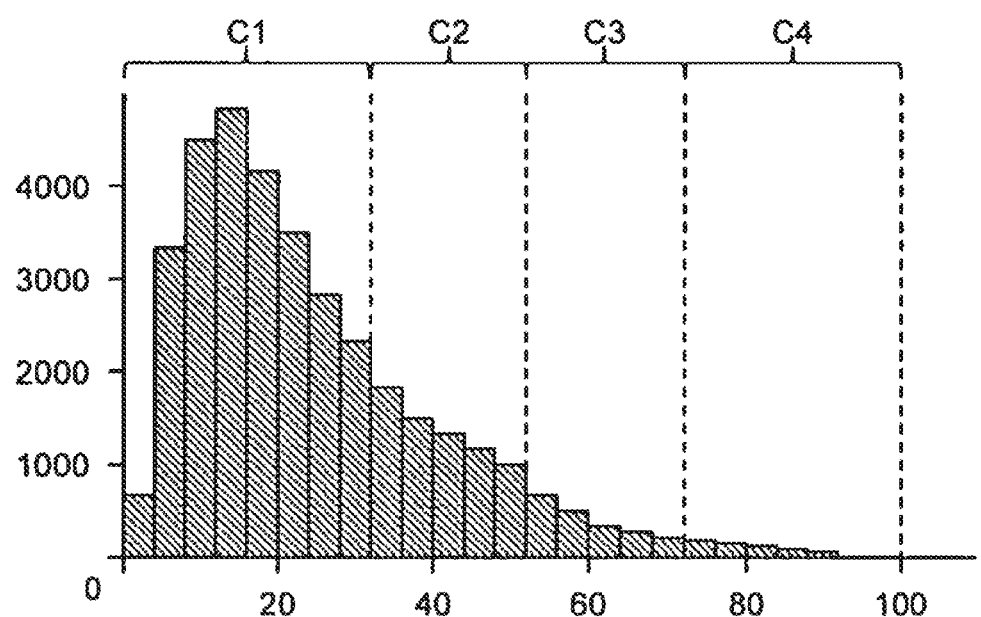

FIG. 7 is a flowchart of a method of testing a semiconductor device, according to some example embodiments, and FIGS. 8A and 8B are graphs showing examples of categories according to some example embodiments. In detail, the flowchart of FIG. 7 shows an example of operation S46 of FIG. 5, and FIGS. 8A and 8B show examples of categories respectively set in different first items. As described above with reference to FIG. 5, in operation S46' of FIG. 7, a plurality of categories of the first item may be set. Hereinafter, FIG. 7 and FIGS. 8A and 8B will be described with reference to FIG. 1.

Referring to FIG. 7, operation S46' may include a plurality of operations S46_2, S46_4, and S46_6. In operation S46_2, a distribution of wafers according to a value of the first item may be obtained. For example, as illustrated in FIG. 8A, wafers may have values of the first item concentrated between two numbers such as 0 and 10, and most wafers may have the lowermost value. As illustrated in FIG. 8B, wafers may have values of the first item distributed between to numbers such as 0 and 100, which may be relatively widely distributed, compared with the example of FIG. 8A. In some example embodiments, the horizontal axis of FIGS. 8A and 8B may be based on a yield of respective wafers; however, example embodiments are not limited thereto. In some example embodiments, the vertical axis of FIGS. 8A and 8B may be based on a count of a number of wafers; however, example embodiments are not limited thereto.

Referring back to FIG. 7, in operation S46_4, threshold values may be calculated, and in operation S46_6, a plurality of categories may be generated. The threshold values may be used as references for generating a plurality of categories. For example, the threshold values may divide the distribution of wafers into a plurality of bands of the same or different values, and the bands may respectively correspond to a plurality of categories. Referring to FIG. 8A, when wafers have values of the first item concentrated in a limited range, bands may also be concentrated on the values of the first item in a limited range. Accordingly, as illustrated in FIG. 8A, first to third categories C1 to C3 may be clustered in values of the first item between 0 to 10, and a fourth category C4 including a relatively small number of wafers may correspond to a large band. Referring to FIG. 8B, when wafers have values of the first item distributed in a wide range, bands may also be distributed in a wide range. Accordingly, as illustrated in FIG. 8B, the first to fourth categories C1 to C4 may be relatively evenly defined in the values of the first item between 0 to 100.

In some example embodiments, the threshold values may be calculated based on a ratio. For example, based on the values of the first item, a first threshold value corresponding to the top k1% of the wafers, for example, from a lower value of the first item, may be calculated, and the band defined according to the first threshold value may be set as a first category. Furthermore, based on the values of the first item, a second threshold value corresponding to k2% of the remaining wafers (1-k1%), for example, from the low value of the first item, may be calculated, and the band defined according to the second threshold value may be set as a second category. In some example embodiments, k1% and k2% may be determined based on experiment and/or simulation, and the like, and the number of bands, for example, the number of categories, may also be determined based on experiment and/or simulation, and the like.

Figure 9A:
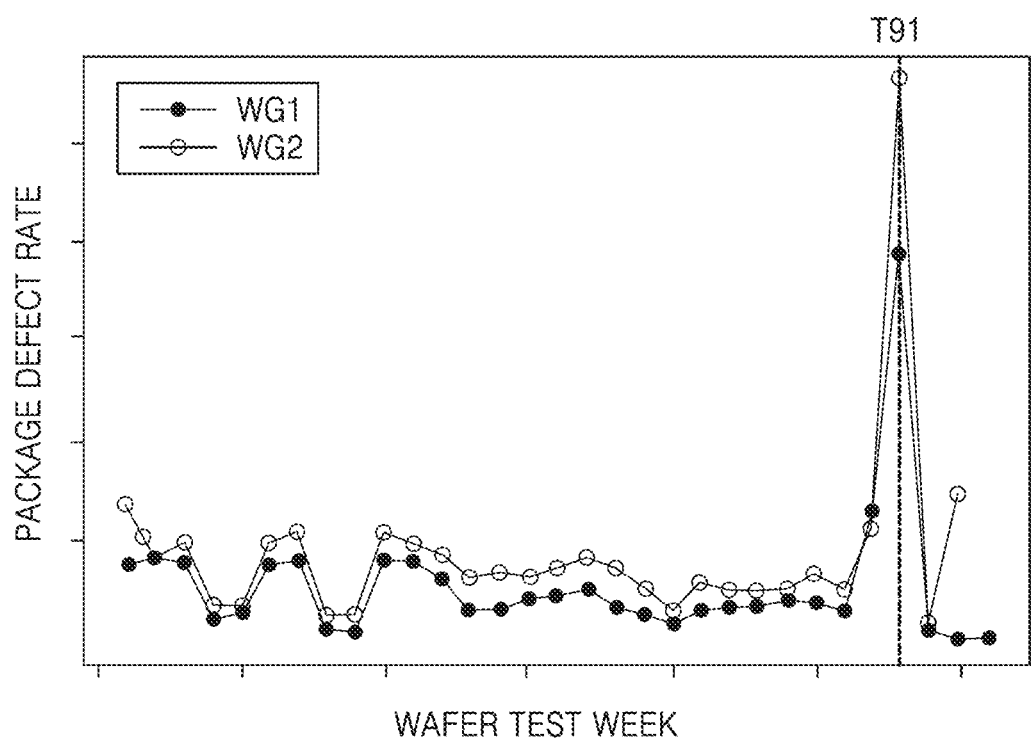
FIGS. 9A and 9B are graphs showing package defect rates according to some example embodiments.
Figure 9B:
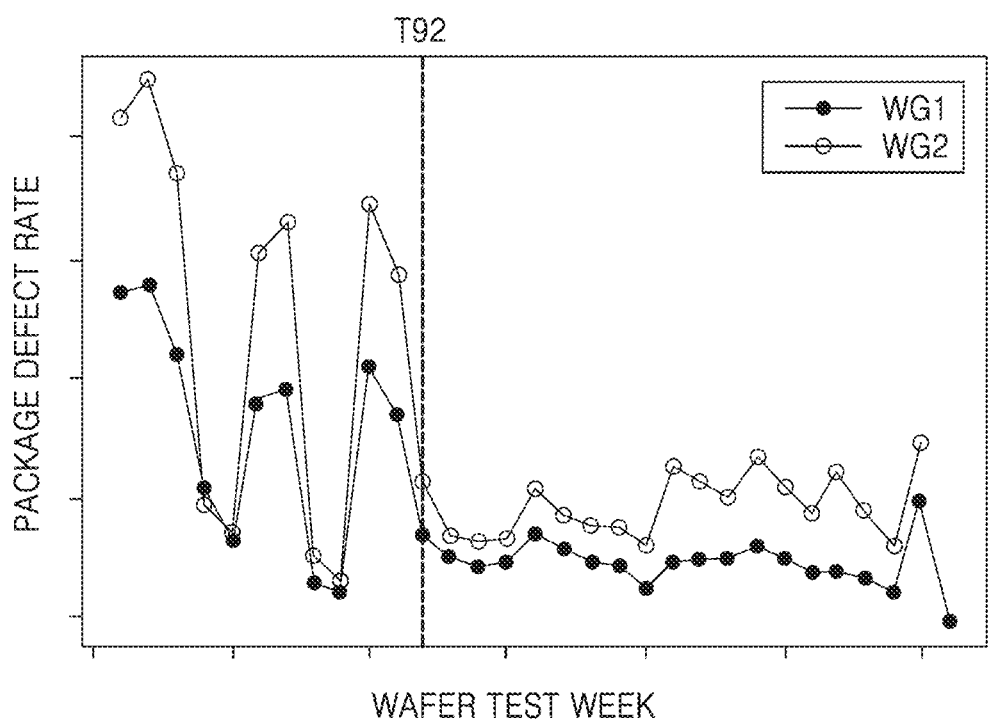

FIGS. 9A and 9B are graphs showing package defect rates according to some example embodiments. In detail, the graphs of FIGS. 9A and 9B show package defect rates measured every week with respect to two wafer groups in a semiconductor process. In FIGS. 9A and 9B, the first wafer group WG1 may correspond to the top 80% of wafers (e.g., the top 80% yielding wafers), and the second wafer group WG2 may correspond to the bottom 20% of the wafers (e.g., the bottom 20% yielding wafers). As described above, when different package defect rates are detected from the wafer groups, the first item based on which the wafer groups are defined may be determined to have a correlation with the package defect.

Referring to FIG. 9A, at a time point T91, a difference between the package defect rate of the first wafer group WG1 and the package defect rate of the second wafer group WG2 may increase before the time point T91. For example, the package defect may increase due to a factor generated before and after the time point T91, and the factor may have a correlation with the first item based on which the first wafer group WG1 and the second wafer group WG2 of FIG. 9A are defined.

Referring to FIG. 9B, a relatively high package defect may be generated in a semiconductor process due to various factors until a time point T92. As the factors are removed from the time point T92, the semiconductor process may be stabilized, and the package defect rate may decrease. However, as illustrated in FIG. 9B, as time flows, the difference between the package defect rate of the first wafer group WG1 and the package defect rate of the second wafer group WG2 may gradually increase, and in particular, an increase in the package defect rate of the second wafer group WG2 may be detected.

As described above with reference to FIG. 1, the number of first items ITM1 used for the wafer test 12 may be several thousand or more, and a method to manage the quality of a semiconductor device may be required as a certain reference with reference to the first items ITM1. Hereinafter, a method using a certain reference with respect to the first items ITM1 will be described below with reference to FIG. 10.

Figure 10:
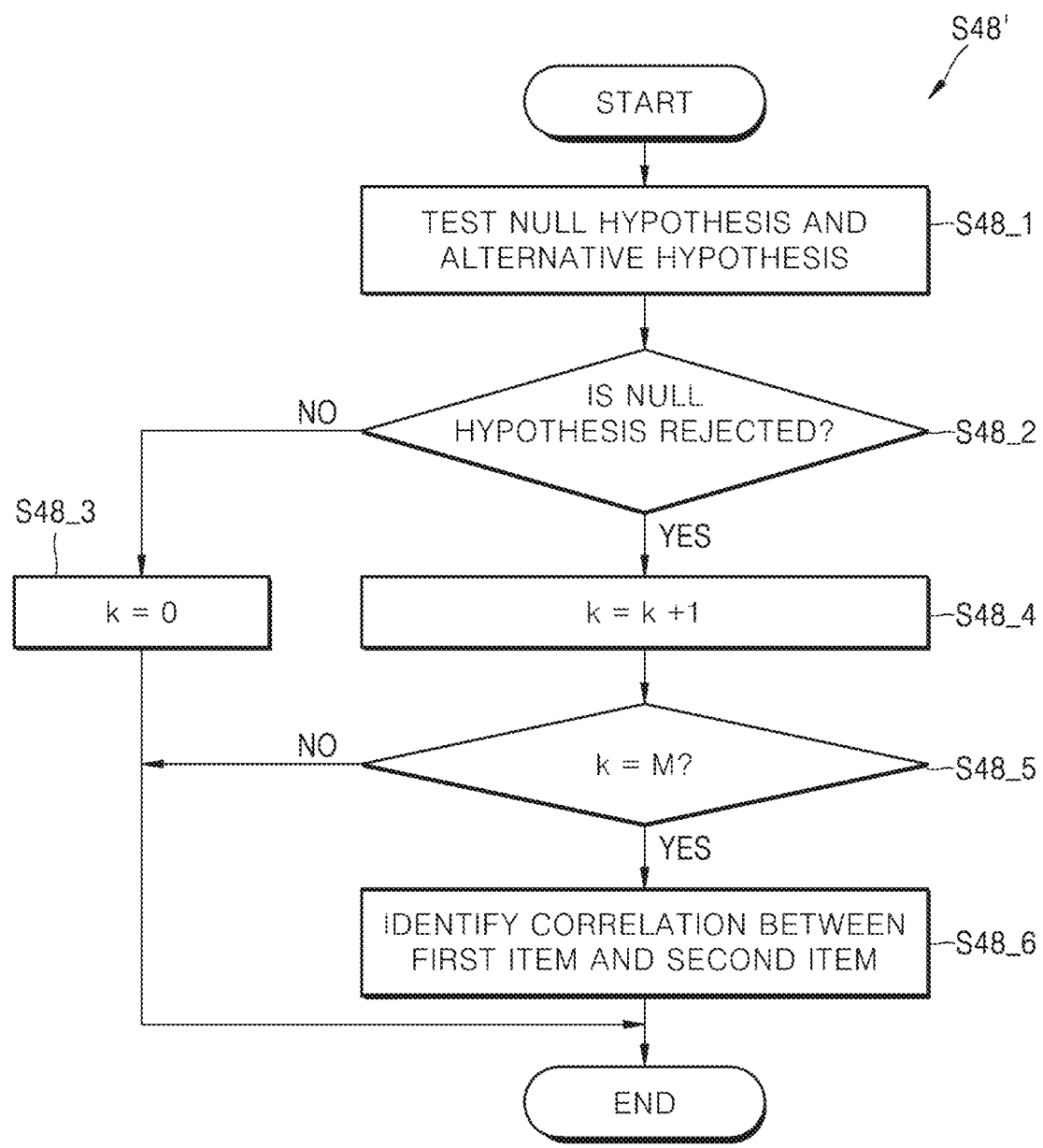
FIG. 10 is a flowchart of a method of testing a semiconductor device, according to some example embodiments.

FIG. 10 is a flowchart of a method of testing a semiconductor device, according to some example embodiments. In detail, the flowchart of FIG. 10 shows an example of operation S48 of FIG. 5. As described above with reference to FIG. 5, in operation S48' of FIG. 10, the correlations between a first item and second items may be identified. The correlations may be or be based on a linear correlation coefficient; however, example embodiments are not limited thereto. Referring to FIG. 10, operation S48' may include a plurality of operations S48_1 to S48_6. In some example embodiments, operation S48' may be performed periodically, for example, every week. Hereinafter, FIG. 10 will be described with reference to FIG. 1.

Referring to FIG. 10, in operation S48_1, a null hypothesis and an alternative hypothesis may be tested. In some example embodiments, a statistical hypothesis test may be employed to apply a certain reference to the thousands of the first items ITM1. A statistical hypothesis test may refer to a method of determining the validity of a hypothesis using information about a sample, with respect to a hypothesis, for example, a null hypothesis, that defines the actual value of a population, or may be simply refer to a hypothesis test. For example, to employ a statistical hypothesis test, a null hypothesis $H_0$ and an alternative hypothesis $H_1$ may be defined as [Equation 1] below.

$$H_0: \mu_i = \mu_j, H_1: \mu_i > \mu_j \qquad \text{[Equation 1]}$$

In [Equation 1], $\mu_i$ may denote an average (or mean) of package defect rates corresponding to an i-th wafer group, and $\mu_j$ may denote an average (or mean) of package defect rates corresponding to a j-th wafer group. In some example embodiments, the j-th wafer group may include upper wafers in a first item in the i-th wafer group. Furthermore, in some example embodiments, different from [Equation 1], the null hypothesis $H_0$ may be defined to be within a certain range in which $\mu_i$ includes $\mu_j$.

In operation S48_2, whether to reject the null hypothesis may be determined. As illustrated in FIG. 10, when the null hypothesis is rejected, for example, the average $\mu_i$ of the package defect rates of the i-th wafer group is greater than the average $\mu_j$ of the package defect rates of the j-th wafer group, in operation S48_4, a variable k may increase by 1. When the test of the null hypothesis is successful, in operation S48_3, the variable k may be reset to zero. The variable k may indicate the number of continuous rejections of the null hypothesis, and accordingly, may increase by 1 when the null hypothesis is rejected. Otherwise, when the rejection of the null hypothesis fails, the variable k may be initialized.

When the null hypothesis is rejected, in operation S48_5, the variable k may be compared with a constant M. The constant M may be dynamically defined (or, alternatively, may be predefined, e.g. defined before operation S48_1). As illustrated in FIG. 10, when the variable k is different from a constant M, for example, the variable k is less than the constant M, operation S48' may be terminated. When the variable k is the same as the constant M, for example, the null hypothesis has been continuously rejected M times, operation S48_6 may be performed subsequently.

In operation S48_6, a correlation between a first item and a second item may be identified. When the null hypothesis has continuously been rejected M times, it may indicate that there is a difference between the package defect rates of the i-th wafer group and the package defect rates of the j-th wafer group. Accordingly, it may be determined that the second item that defines the package defect rates has dependency on the first item based on which the i-th wafer group and the j-th wafer group are defined, and accordingly, it may be determined that there is a correlation between the first item and the second item.

Figure 11:
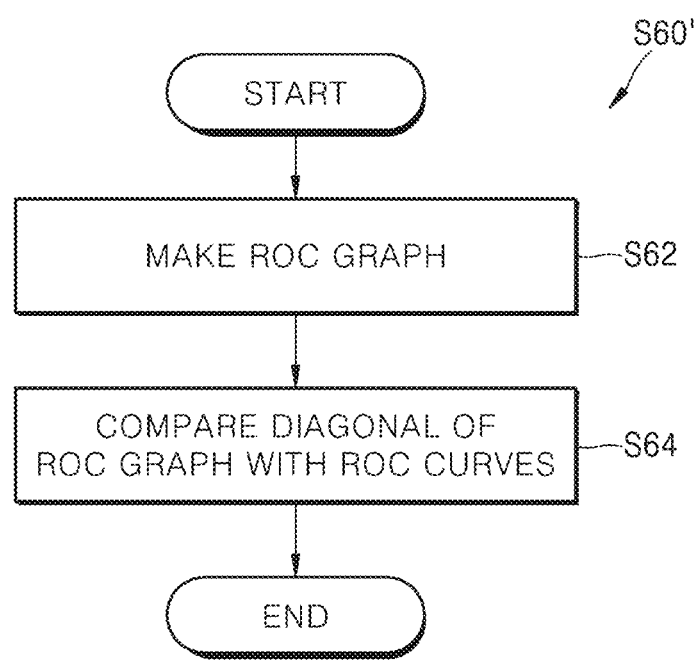
FIG. 11 is a flowchart of a method of testing a semiconductor device, according to some example embodiments.
Figure 12:
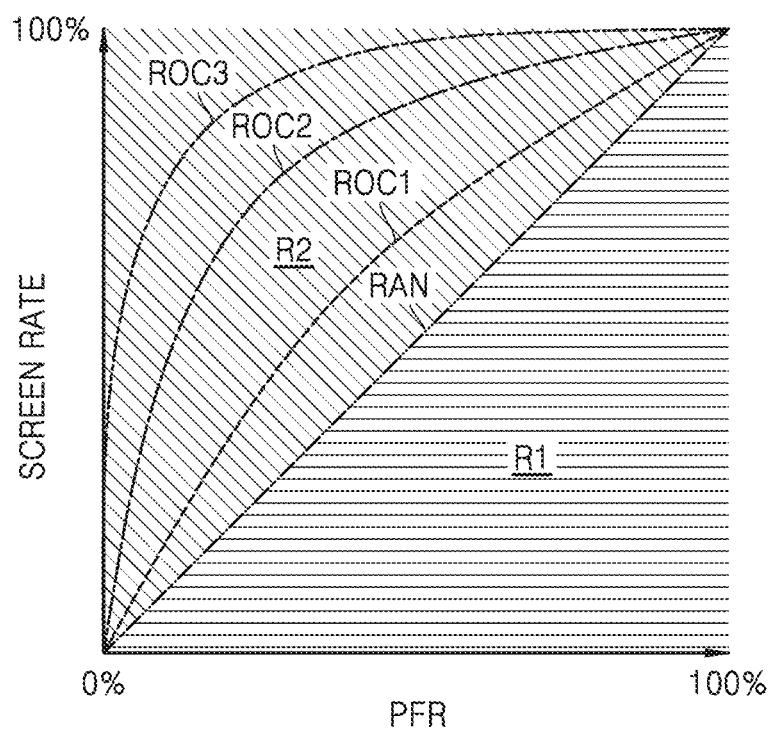
FIG. 12 is a graph showing receiver operating characteristics (ROC) curves according to some example embodiments.

FIG. 11 is a flowchart of a method of testing a semiconductor device, according to some example embodiments. FIG. 12 is a graph showing receiver operating characteristics (ROC) curves according to some example embodiments. In detail, the flowchart of FIG. 11 shows an example of operation S60 of FIG. 2, and FIG. 12 shows an example of ROC graphs used in operation S60' of FIG. 11. As described above with reference to FIG. 2, in operation S60' of FIG. 11, at least one first item affecting package variation may be identified. Hereinafter, FIGS. 11 and 12 will be described with reference to FIG. 1.

Referring to FIG. 11, operation S60' may include operation S62 and operation S64. In operation S62, an ROC graph may be made. An ROC graph, or an ROC space, may refer to a graph having a true positive rate as the Y-axis (or vertical axis, or second axis) and a false positive rate as the X-axis (or horizontal axis or first axis). In some example embodiments, to identify at least one first item affecting the package defect rate, an ROC curve may be drawn in a modified ROC graph. Herein, the modified ROC graph may be referred to as a screen-ability (S)-chart.

Referring to FIG. 12, the X-axis of the S-chart may denote or correspond to a ratio of wafers in which a package defect is predicted to be generated in the first item, for example, a predicted failure rate (PFR). The Y-axis of the S-chart may denote a ratio of packages screened through the predicted defect from the total defective packages. A diagonal RAN in the graph may denote a random case, and a first region R1 below the diagonal RAN may correspond to a case poorer than a random case. Furthermore, in a second region R2 above the diagonal RAN, a more advantageous result may be obtained farther from the diagonal RAN. For example, a third S-chart curve ROC3 may denote a result more advantageous than the results of a first 5-chart curve ROC1 and a second S-chart curve ROC2.

Referring back to FIG. 11, in operation S64, the diagonal of the S-chart may be compared with the S-chart curves. As described above with reference to FIG. 12, the S-chart space may be divided into the first region R1 below the diagonal RAN and the second region R2 above the diagonal RAN, and when the S-chart curve is included in the diagonal RAN and the first region R1, the first item may not be determined to affect package variation. When the S-chart curve is included in the second region R2, the first item may be determined to affect package variation. The S-chart curve may be variously interpreted and used depending on the shape, and examples of the S-chart curve will be described below with reference to FIGS. 13A to 13D.

FIGS. 13A to 13D are graphs showing examples of S-chart curves according to some example embodiments. As described above with reference to FIGS. 11 and 12, an S-chart curve may be drawn in the S-chart space in which a ratio of wafers in which a package defect is predicted to be generated in the first item, that is, PFR, is the X-axis, and a ratio of packages screened through the predicted defect from the total defective packages is the Y-axis.

Figure 13A:
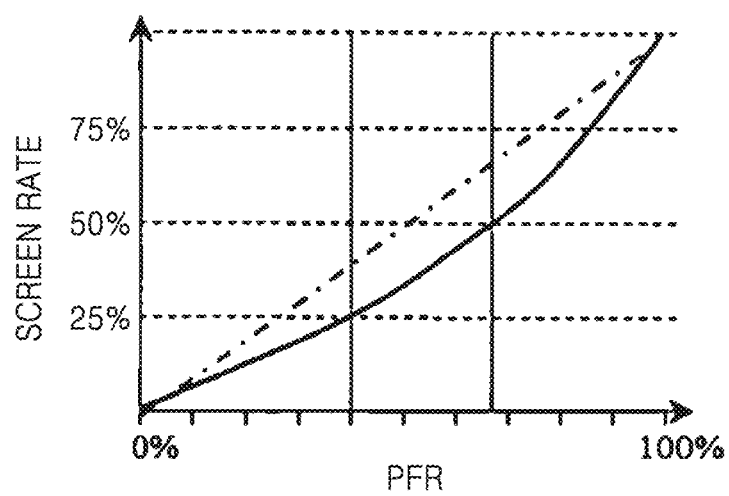
FIGS. 13A to 13D are graphs showing examples of ROC curves according to some example embodiments.

Referring to FIG. 13A, an S-chart curve may be below the diagonal of the S-chart space. The diagonal of the S-chart space indicates a random case, and the S-chart curve of FIG. 13A may indicate a case poorer than the random case. Accordingly, it may be determined that the first item corresponding to the S-chart curve of FIG. 13A does not affect package defect.

Figure 13B:
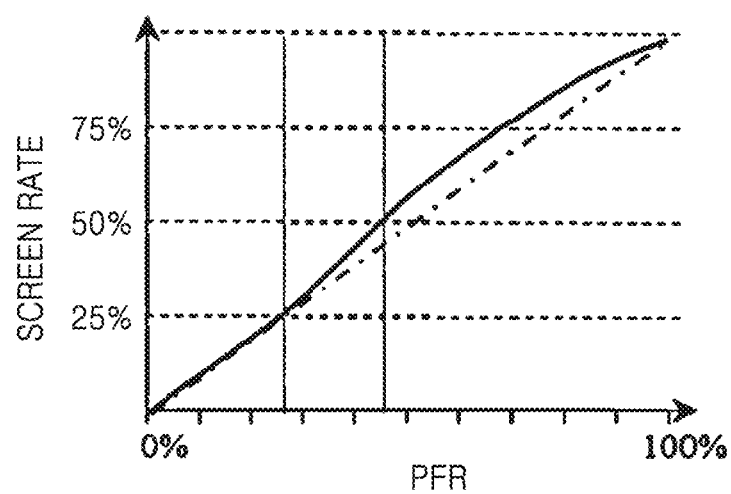

Referring to FIG. 13B, the S-chart curve may be above the diagonal of the S-chart space. Although the S-chart curve of FIG. 13B indicates a result better than the random case, a result similar to the random case may be obtained in a section in which PFR is low. Accordingly, it may not be determined that the first item corresponding to the S-chart curve affects package defect.

Figure 13C:
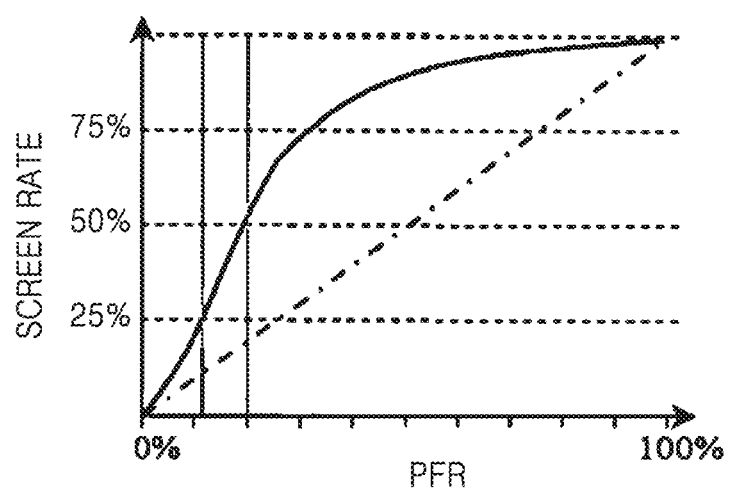
Figure 13D:
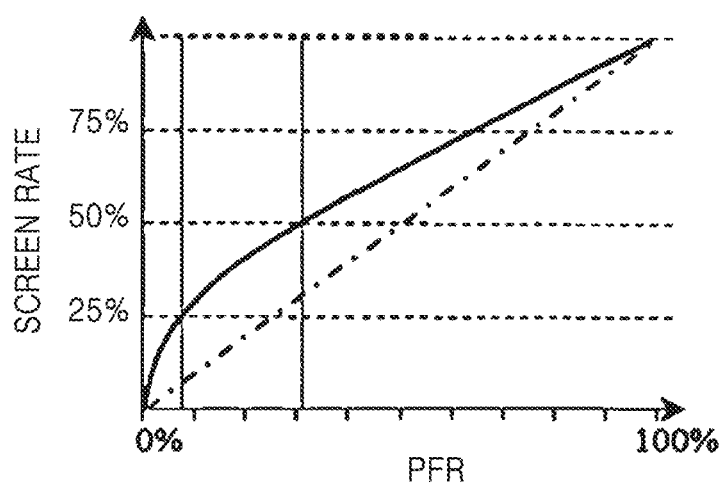

Referring to FIGS. 13C and 13D, in the entire section of PFR, S-chart curves may be above the diagonal of the S-chart space, and may respectively correspond to different types. For example, the S-chart curve of FIG. 13C may be farther from the diagonal in a section in which PFR is higher than that of a section in which PFR is relatively low, whereas the S-chart curve of FIG. 13D may be farther from the diagonal in a section in which PFR is lower than that of a section in which PRF is relatively high. The S-chart curves respectively corresponding to different types may be appropriately used, as necessary. For example, when it is intended to screen less than 25% of package defects, less than 10% of wafers only may be determined to be defective through the first item corresponding to the S-chart curve of FIG. 13C. When it is intended to screen 50% or more of package defects, a relatively small number of wafers only may be determined to be defective through the first item corresponding to the S-chart curve of FIG. 13D.

Figure 14:
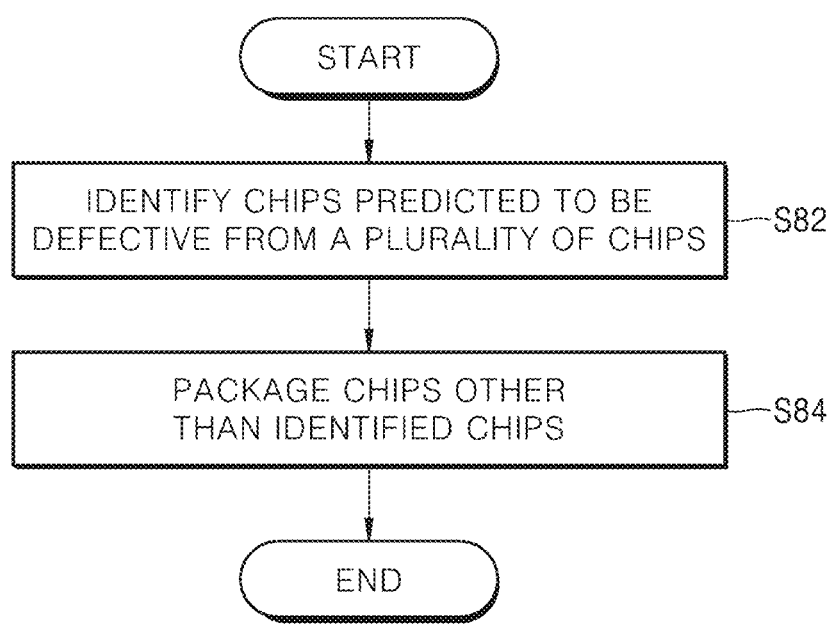
FIG. 14 is a flowchart of a method of manufacturing a semiconductor device, according to some example embodiments.

FIG. 14 is a flowchart of a method of manufacturing a semiconductor device, according to some example embodiments. As illustrated in FIG. 14, the method of manufacturing a semiconductor device may include operation S82 and operation S84. In some example embodiments, operation S82 and operation S84 of FIG. 14 may be performed following operation S60 of FIG. 2. Hereinafter, FIG. 14 will be described with reference to FIG. 1.

Referring to FIG. 14, in operation S82, chips predicted to be defective may be identified from a plurality of chips. For example, as described above with reference to the drawings, at least one first item affecting package defect may be identified from the first items ITM1 used for the wafer test 12. Chips predicted to be defective may be identified according to the value of an identified at least one first item, and accordingly, defects of packages may be earlier detected before the packaging 14.

In operation S84, chips other than the identified chips may be packaged. For example, the chips predicted to be defective in operation S82 may be excluded from the packaging 14. Accordingly, unnecessary packaging may be excluded. The efficiency of the packaging 14 and the semiconductor process 10 may be increased.

Figure 15:
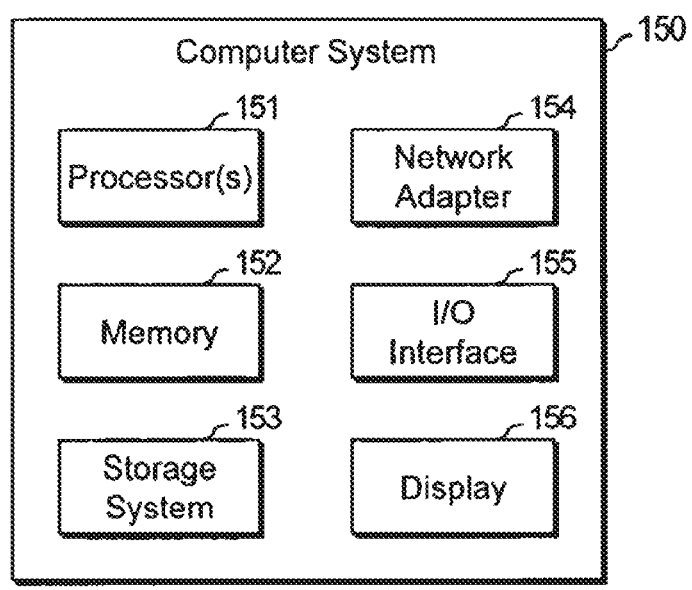
FIG. 15 is a block diagram of a computer system according to some example embodiments.

FIG. 15 is a block diagram of a computer system 150 according to some example embodiments. In some example embodiments, the computer system 150 of FIG. 15 may perform at least a portion of the method of testing and/or manufacturing a semiconductor device described above with reference to the drawings.

The computer system 150 may refer to a certain system including a general purpose or special purpose computing system. For example, the computer system 150 may include personal computers, server computers, laptop computers, home appliances, and the like. As illustrated in FIG. 15, the computer system 150 may include at least one processor 151, a memory 152, a storage system 153, a network adapter 154, an input/output (I/O) interface 155, and a display 156.

The at least one processor 151 may execute a program module including computer system executable instructions. The program module may include routines, programs, objects, components, logics, data structures, and the like, which perform particular tasks or implement particular abstract data types.

The memory 152 may include a computer system-readable medium in the form of a volatile memory, such as random access memory (RAM). The at least one processor 151 may access the memory 152, and execute instructions loaded on the memory 152 or process data loaded on the memory 152.

The storage system 153 may store information in a non-volatile manner, and in some example embodiments, may include at least one program product including a program module configured to perform the method of testing and manufacturing a semiconductor device described above with reference to the drawings. The program module may include, as a non-limiting example, an operating system, at least one application, and other program modules and program data. In some example embodiments, the storage system 153 may store data used to test and manufacture a semiconductor device. For example, the storage system 153 may store the first items ITM1, the first data TD1, the second items ITM2, and/or the second data TD2 of FIG. 1.

The network adaptor 154 may provide a connection to a local area network (LAN), a wide area network (WAN), a public network, for example, the Internet, and/or the like. The input/output interface 155 may provide a communication channel with peripheral devices, such as a keyboard, a pointing device, an audio system, and the like. The display 156 may output various pieces of information to be checked by a user.

In some example embodiments, the method of testing and manufacturing a semiconductor device described above with reference to the drawings may be implemented by a computer program product. The computer program product may include a non-transitory computer-readable medium (or a storage medium) including computer-readable program instructions so that the at least one processor 151 performs the method of testing and manufacturing a semiconductor device. The computer-readable instructions may include, as a non-limiting example, one or more of assembler instructions, instruction set architecture (ISA) instructions, machine instructions, machine-dependent instructions, micro-code, firmware instructions, state setting data, and source code or object code written in at least one programming language.

The computer-readable medium may be a certain type of a medium that keeps and stores instructions executed by the at least one processor 151 or a certain instruction executable apparatus, in a non-transitory manner The computer-readable medium may be an electronic storage device, a magnetic storage device, an optical storage device, an electromagnetic storage device, a semiconductor storage device, or any combination thereof, but is not limited thereto. For example, the computer-readable medium may include one or more of a portable computer diskette, a hard disk, RAM, read-only memory (ROM), electrically erasable programmable read-only memory (EEPROM), flash memory, static random access memory (SRAM), a CD, a DVD, a memory stick, a floppy diskette, a mechanically encoded device such as punch cards, or any combination thereof. Elements of FIG. 15 may communicate with other elements of FIG. 15, to exchange data and/or instructions.

Figure 16:
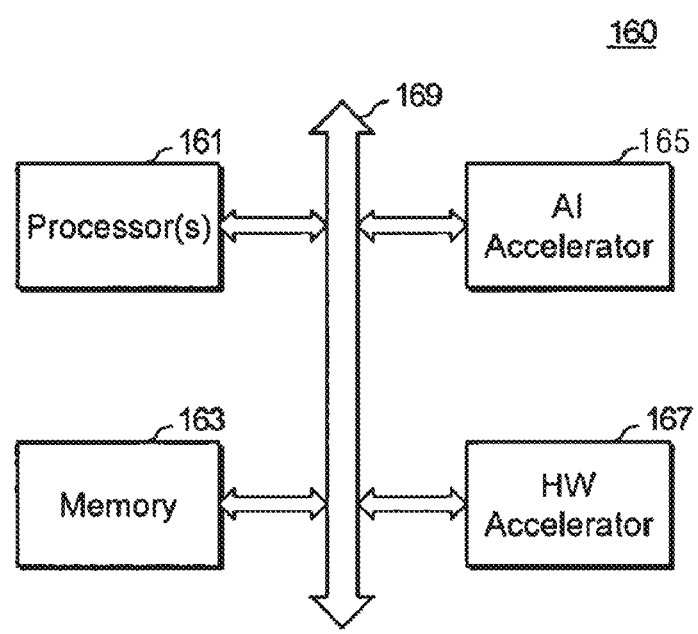
FIG. 16 is a block diagram of a system according to some example embodiments.

FIG. 16 is a block diagram of a system 160 according to some example embodiments. In some example embodiments, at least a portion of the method of testing and manufacturing a semiconductor device, according to some example embodiments, may be executed in the system 160.

Referring to FIG. 16, the system 160 may include at least one processor 161, a memory 163, an artificial intelligence (AI) accelerator 165, and a hardware (HW) accelerator 167, and the at least one processor 161, the memory 163, the AI accelerator 165, and the hardware accelerator 167 may communicate with each other via a bus 169. In some example embodiments, the at least one processor 161, the memory 163, the AI accelerator 165, and the hardware accelerator 167 may be included in one semiconductor chip. Furthermore, in some example embodiments, at least two of the at least one processor 161, the memory 163, the AI accelerator 165, and the hardware accelerator 167 may each be included in two or more semiconductor chips mounted on a board.

The at least one processor 161 may execute instructions. For example, the at least one processor 161 may execute an operating system by executing instructions stored in the memory 163, or execute applications executed on the operating system. In some example embodiments, the at least one processor 161 may instruct, by executing instructions, a task to the AI accelerator 165 and/or the hardware accelerator 167, and may obtain a result of performance of the task from the AI accelerator 165 and/or the hardware accelerator 167. In some example embodiments, the at least one processor 161 may support an application specific instruction set processor (ASIP) that is customized for a specific purpose, and an exclusive instruction set.

The memory 163 may have a certain structure for storing data. For example, the memory 163 may include a volatile memory device, such as one or more of dynamic random access memory (DRAM), static random access memory (SRAM), and the like, and/or a non-volatile memory device, such as one or more of flash memory, resistive random access memory (RRAM), and the like. The at least one processor 161, the AI accelerator 165, and the hardware accelerator 167 may store data on the memory 163 or read out data from the memory 163, via the bus 169.

The AI accelerator 165 may refer to hardware designed for AI applications. In some example embodiments, the AI accelerator 165 may include a neural processing unit (NPU) for implementing a neuromorphic structure, generate output data by processing input data provided from the at least one processor 161 and/or the hardware accelerator 167, and provide output data to the at least one processor 161 and/or the hardware accelerator 167. In some example embodiments, the AI accelerator 165 may be programmable, and may be programed by the at least one processor 161 and/or the hardware accelerator 167.

The hardware accelerator 167 may refer to hardware designed to perform a particular task at a high speed. For example, the hardware accelerator 167 may be designed to perform a high speed data conversion, such as demodulation, modulation, encoding, decoding, and the like. The hardware accelerator 167 may be programmable, and may be programed by the at least one processor 161 and/or the hardware accelerator 167.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While various example embodiments have been particularly shown and described using specific terminologies, example embodiments and terminologies should be considered in descriptive sense only and not for purposes of limitation. Therefore, it will be understood by those of ordinary skill in the art that various changes in form and details may be made therein without departing from the spirit and scope of the disclosure as defined by the following claims. Furthermore example embodiments are not necessarily mutually exclusive with one another. For example, some example embodiments may include one or more features described with reference to one or more figures, and may also include one or more other features described with reference to one or more other figures.

What is claimed is:

1. A method of testing a semiconductor device, the method comprising:
   obtaining first data generated by testing wafers, each including a plurality of chips, the obtaining the first data based on a plurality of first items;
   obtaining second data generated by testing packages, each including a packaged chip, the obtaining the second data based on a plurality of second items;
   detecting correlations between the plurality of first items and the plurality of second items, the detecting the correlations based on the first data and the second data;
   identifying at least one first item affecting variation of the packages, based on the correlations;
   identifying chips predicted to be defective from a plurality of chips included in a wafer, based on the identified at least one first item; and
   packaging chips other than the identified chips, wherein the identifying of the at least one first item comprises identifying a first item based on a ratio of wafers in which a package defect is predicted to be generated in the first item, and a ratio of packages screened through a predicted defect from total defective packages.

2. The method of claim 1, wherein the detecting of the correlations comprises removing noise by filtering the first data and the second data.

3. The method of claim 1, wherein the detecting of the correlations comprises grouping values included in the second data such that values respectively corresponding to a plurality of packages obtained by packaging a plurality of chips included in a same wafer are included in a same group.

4. The method of claim 1, wherein the detecting of the correlations comprises:
   setting a plurality of categories in each of the plurality of first items, based on the first data; and
   identifying the correlations based on values of the second data respectively corresponding to the plurality of categories.

5. The method of claim 4, wherein the setting of the plurality of categories comprises:
   obtaining a distribution wafers according to values of one of the plurality of first items;
   calculating threshold values of the one of the plurality of first items, based on the distribution; and
   generating the plurality of categories based on the threshold values.

6. The method of claim 4, wherein the identifying of the correlations comprises:
   testing a null hypothesis with respect to a first item and a second item, based on a statistical hypothesis test;
   testing an alternative hypothesis with respect to the first item and the second item, based on the statistical hypothesis test; and
   when the null hypothesis is continuously rejected by a first number, identifying a correlation between the first item and the second item.

7. The method of claim 1, wherein the identifying of the first item is based on a receiver operating characteristics (ROC) graph showing ROC curves and comprises:
   when the ROC curve is below a diagonal of the ROC graph, determining that the first item does not affect package variation; and
   when the ROC curve is above the diagonal of the ROC graph, determining that the first item affects the package variation.

8. A system comprising:
   at least one processor; and
   a non-transitory computer-readable medium including a series of instructions,
   wherein the at least one processor is configured to perform, by executing the series of instructions,
   obtaining first data generated by testing wafers, each including a plurality of chips, the obtaining the first data based on a plurality of first items,
   obtaining second data generated by testing packages, each including a packaged chip, based on a plurality of second items,
   detecting correlations between the plurality of first items and the plurality of second items, the detecting the correlations based on the first data and the second data,
   identifying at least one first item affecting variation of the packages, based on the correlations,
   managing a wafer fabrication based on the identifying,
   identifying chips predicted to be defective from a plurality of chips included in the wafer, based on the identified at least one first item, and
   packaging chips other than the identified chips, based on the identifying the chips, wherein
   the plurality of first items is an order of magnitude greater than the plurality of second items.

9. The system of claim 8, wherein the detecting of the correlations comprises:
   setting a plurality of categories in each of the plurality of first items based on the first data; and
   identifying the correlations based on values of the second data respectively corresponding to the plurality of categories.

10. The system of claim 9, wherein the setting of the plurality of categories comprises:
    obtaining a distribution of wafers according to values of one of the plurality of first items;
    calculating threshold values of the one of the plurality of first items, based on the distribution; and
    generating the plurality of categories based on the threshold values.

11. The system of claim 9, wherein the identifying of the correlations comprises:
    testing a null hypothesis with respect to a first item and a second item, based on a statistical hypothesis test;
    testing an alternative hypothesis with respect to the first item and the second item, based on the statistical hypothesis test; and
    in response to the null hypothesis continuously rejected by a first number, identifying a correlation between the first item and the second item.

12. The system of claim 8, wherein the identifying of the at least one first item comprises identifying a first item based on a receiver operating characteristics (ROC) graph showing ROC curves,
    a first-axis of the ROC graph corresponds to a ratio of wafers in which a package defect is predicted to be generated in the first item, and
    a second-axis of the ROC graph corresponds to a ratio of packages screened through a predicted defect from total defective packages.

13. The system of claim 12, wherein the identifying of the first item based on the ROC graph comprises:
in response to the ROC curve being below a diagonal of the ROC graph, determining that the first item does not affect package variation; and
in response to the ROC curve being above the diagonal of the ROC graph, determining that the first item affects the package variation.

14. The system of claim 8, wherein the at least one processor is further configured to:
group the wafers into a plurality of groups, the plurality of groups including a first group having a first number of wafers and a second group having a second number of wafers, different than the first number, wherein the identifying is based on the first group and the second group.

15. A non-transitory computer-readable medium for storing a series of instructions, wherein the series of instructions, when executed by at least one processor, allow the at least one processor to perform a method of testing a semiconductor device, and
the method of testing a semiconductor device comprises:
obtaining first data generated by testing wafers, each including a plurality of chips, the obtaining the first data based on a plurality of first items;
obtaining second data generated by testing packages, each including a packaged chip, the obtaining the second data based on a plurality of second items;
detecting correlations between the plurality of first items and the plurality of second items, the detecting the correlations based on the first data and the second data;
identifying at least one first item affecting variation of the packages, based on the correlations,
managing a wafer fabrication based on the identifying,
identify chips predicted to be defective from a plurality of chips included in the wafer, based on the identified at least one first item, and
package chips other than the identified chips, based on the identifying the chips, wherein
the plurality of first items is an order of magnitude greater than the plurality of second items.

16. The non-transitory computer-readable medium of claim 15, wherein the detecting of the correlations comprises:
setting a plurality of categories in each of the plurality of first items, based on the first data; and
identifying the correlations based on values of the second data respectively corresponding to the plurality of categories.

17. The non-transitory computer-readable medium of claim 16, wherein the setting of the plurality of categories comprises:
obtaining a distribution of wafers according to values of one of the plurality of first items;
calculating threshold values of the one of the plurality of first items, based on the distribution; and
generating the plurality of categories based on the threshold values.

18. The non-transitory computer-readable medium of claim 16, wherein the identifying of the correlations comprises:
testing a null hypothesis with respect to a first item and a second item, based on a statistical hypothesis test;
testing an alternative hypothesis with respect to the first item and the second item, based on the statistical hypothesis test; and
in response to the null hypothesis being continuously rejected by a first number, identifying a correlation between the first item and the second item.

19. The non-transitory computer-readable medium of claim 18, wherein the identifying of the at least one first item comprises identifying a first item based on a receiver operating characteristics (ROC) graph showing ROC curves,
a first-axis of the ROC graph corresponds to a ratio of wafers in which a package defect is predicted to be generated in the first item, and
a second-axis of the ROC graph corresponds to a ratio of packages screened through a predicted defect from total defective packages.

* * * * *